(12) United States Patent
Tran (10) Patent No.: US 9,854,549 B1
(45) Date of Patent: *Dec. 26, 2017

(54) METHODS AND APPARATUS FOR SYNCHRONIZING BEACON TRANSMISSIONS IN A NEIGHBOR AWARENESS NETWORK (NAN)

(71) Applicant: Marvell International Ltd., Hamilton (BM)

(72) Inventor: Binh Quoc Tran, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,375

(22) Filed: Jan. 18, 2017

Related U.S. Application Data (63) Continuation of application No. 14/679,957, filed on Apr. 6, 2015.

(60) Provisional application No. 61/976,395, filed on Apr. 7, 2014.

(51) Int. Cl.
*H04W 56/00* (2009.01)
*H04W 84/10* (2009.01)
*H04W 48/16* (2009.01)

(52) U.S. Cl.
CPC ......... *H04W 56/001* (2013.01); *H04W 48/16* (2013.01); *H04W 84/10* (2013.01)

(58) Field of Classification Search
CPC .... H04W 56/001; H04W 48/16; H04W 84/10
See application file for complete search history.

(56) References Cited

U.S. PATENT DOCUMENTS

| | | | |
|---|---|---|---|
| 9,398,437 B2* | 7/2016 | Kasslin | H04L 45/745 |
| 9,723,582 B1 | 8/2017 | Tran | |
| 2005/0117530 A1 | 6/2005 | Abraham et al. | |
| 2012/0066407 A1 | 3/2012 | Andries et al. | |
| 2014/0080481 A1 | 3/2014 | Abraham et al. | |
| 2014/0082205 A1 | 3/2014 | Abraham et al. | |

(Continued)

OTHER PUBLICATIONS

"Non-Final Office Action", U.S. Appl. No. 14/679,957, dated Sep. 16, 2016, 6 pages.

(Continued)

*Primary Examiner* — Brian D Nguyen (57) ABSTRACT

The present disclosure describes methods and apparatus for synchronizing beacon transmissions. Synchronization beacons may be transmitted from multiple nodes during a same time slot of a discovery window with accommodation for managing potential signal interference. For certain example embodiments, a first wireless communication device includes a transceiver and a synchronization beacon transmission system. A transceiver may be configured to transmit a synchronization beacon in a neighbor awareness networking (NAN) environment, wherein the NAN environment includes multiple wireless communication devices arranged in a cluster. A synchronization beacon transmission system may be configured to determine a transmission time based at least partially on an operation that separates the wireless communication devices of the cluster into multiple groups. A synchronization beacon transmission system may further be configured to cause the transceiver to transmit the synchronization beacon responsive to the determined transmission time.

20 Claims, 8 Drawing Sheets

(56) References Cited

U.S. PATENT DOCUMENTS

| | | | |
|---|---|---|---|
| 2014/0254566 A1* | 9/2014 | Qi | H04W 56/00 |
| | | | 370/336 |
| 2014/0328168 A1* | 11/2014 | Park | H04W 74/0808 |
| | | | 370/230 |
| 2015/0139217 A1* | 5/2015 | Qi | H04W 56/001 |
| | | | 370/350 |
| 2015/0172391 A1* | 6/2015 | Kasslin | H04L 67/16 |
| | | | 370/338 |
| 2015/0172901 A1* | 6/2015 | Kasslin | H04W 4/008 |
| | | | 370/328 |
| 2015/0172902 A1* | 6/2015 | Kasslin | H04L 45/745 |
| | | | 370/328 |
| 2015/0200811 A1 | 7/2015 | Kasslin et al. | |

OTHER PUBLICATIONS

"Notice of Allowance", U.S. Appl. No. 14/679,957, dated Mar. 27, 2017, 5 pages.

* cited by examiner

METHODS AND APPARATUS FOR SYNCHRONIZING BEACON TRANSMISSIONS IN A NEIGHBOR AWARENESS NETWORK (NAN)

CROSS REFERENCE TO RELATED APPLICATION

This application is a continuation of and claims priority to U.S. Utility patent application Ser. No. 14/679,957 filed Apr. 6, 2015, now U.S. Pat. No. 9,723,582, which in turn claims priority to U.S. Provisional Patent Application Ser. No. 61/976,395 filed Apr. 7, 2014, the disclosure of which is incorporated herein by reference in its entirety.

BACKGROUND

Wireless interconnectivity is becoming increasingly pervasive in a myriad of devices across many different environments. For example, pursuit of the so-called "internet of things" may result in wireless computing technology being embedded in many different types of objects, such as shoes or refrigerators in consumer environments or such as manufacturing equipment or inventory management containers in commercial environments. As the number and types of objects with a wireless communication ability increase significantly, wireless interconnectivity between or among different wireless communication devices may likewise grow significantly. As a result of this wireless interconnectivity growth, various wireless communication devices may have substantially different native capabilities or may have direct access to dramatically different network features. If such native capabilities or network features were to be restricted solely to their respective devices, the potential benefits of expanding wireless interconnectivity would be appreciably limited.

SUMMARY

In general, in one example aspect, this specification describes a first wireless communication device for synchronizing beacon transmissions in a neighbor awareness network (NAN). The first wireless communication device includes a transceiver and a synchronization beacon transmission system. The transceiver may be configured to transmit a synchronization beacon in a NAN environment, wherein the NAN environment includes multiple wireless communication devices arranged in a cluster. The synchronization beacon transmission system may be configured to determine a transmission time based at least partially on an operation that separates the wireless communication devices of the cluster into multiple groups. The synchronization beacon transmission system may further be configured to cause the transceiver to transmit the synchronization beacon responsive to the determined transmission time.

In general, in another example aspect, this specification describes a method for synchronizing beacon transmissions that is implemented with a first wireless communication device. The method may include determining, in a neighbor awareness networking (NAN) environment that includes multiple wireless communication devices arranged in a cluster, a transmission time based at least partially on an operation that separates the wireless communication devices of the cluster into multiple groups. The method may also include transmitting a synchronization beacon in the NAN environment responsive to the determined transmission time.

In general, in yet another example aspect, this specification describes a computer-readable memory device comprising computer-executable instructions that, when executed, implement a system for synchronizing beacon transmissions in a first wireless communication device to determine, in a neighbor awareness networking (NAN) environment that includes multiple wireless communication devices arranged in a cluster, a transmission time based at least partially on an operation that separates the wireless communication devices of the cluster into multiple groups. The system is further implemented to transmit a synchronization beacon in the NAN environment responsive to the determined transmission time.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference number in different instances in the description and the figures indicates like elements.

DETAILED DESCRIPTION

As noted hereinabove, various wireless communication devices may have substantially different native capabilities or direct access to dramatically different network features. Examples of native capabilities may include processing speed, display size or resolution, agency authority or accessibility, installed software, person-machine interface options, locally-stored data, printing capacity, imaging ability, local authentication or authorization level, a combination thereof, and so forth. Examples of network features may include network bandwidth, wireless versus wireline, local area network (LAN) versus internet, remotely-relevant authentication or authorization level, access to remotely-stored data, access to shared or server storage, access to remotely-located or so-called cloud services, encrypted communication capacity, network latency, access to particular network nodes, unlimited or metered or capped data, a combination thereof, and so forth. Capabilities and features of devices, whether native or network-based, may be considered examples of services that are usable by other devices or end-users. Devices that are able to communicate wirelessly can learn to exchange information about, or actually share, services that are provided or directly-accessible by, or otherwise primarily associated with, a given device.

One approach to exchanging information or sharing services over a network entails distributing synchronization data to organize wireless communication devices that serve as nodes that form the network. Synchronization data can be used to facilitate a smooth network operation as well as information exchange that is efficient from a power and spectrum perspective. The farther synchronization data can be distributed, the larger a cluster of devices for a network can grow. And the larger a network cluster grows, the more widely can information be exchanged and services be shared via the network cluster. However, if the distribution of synchronization data is limited, the benefits of wireless interconnectivity may be geographically curtailed or otherwise limited.

One approach to distributing synchronization data may involve transmission of synchronization beacons. Due to the finite nature of the electromagnetic spectrum and a desire to prioritize transmission of user-related data, transmission of synchronization beacons may be assigned to a particular channel and time window. Unfortunately, assignment to a particular channel and time window may result in a finite time span in which to transmit synchronization beacons. Multiple synchronization beacons may be transmitted within a single time slot of multiple time slots of the finite time span, but many synchronization beacons may be lost due to cross interference arising from simultaneous transmission. Hence, this finite time span may translate into a corresponding finite number of synchronization beacons if contention is to be avoided by assigning each synchronization beacon an individual time slot (e.g., if non-overlapping sequential transmission of synchronization beacons is implemented across a finite time span). Unfortunately, if synchronization beacons are constrained to a finite number, a size of a network cluster is also constrained inasmuch as only a finite number of nodes may transmit synchronization beacons.

On the other hand, a technique that enables a theoretically unlimited number of synchronization beacon transmissions within a finite-sized window effectively increases a feasible size of a network cluster. Hence, implementation of a technique to enable unlimited transmission of synchronization beacons within a finite-sized window may also increase a feasible scope and range of information exchanging and service sharing for a network cluster of wireless communication devices. This in turn may help fulfill the promise of expanding wireless interconnectivity.

For certain example embodiments, different implementations or aspects of synchronization beacon transmission are described herein. By way of example only, wireless communication devices may be separated into groups based at least partly on relative distances between or among the wireless communication devices (e.g., separated into groups that are likely sufficiently far apart from one another so as to reduce a probability of signal interference). To avoid having a width of a finite-sized window act as a limiting factor for synchronization beacon transmission, multiple synchronization beacons may be transmitted simultaneously or at times that at least partially overlap for respective multiple wireless communication devices that are separated into a single group. Hop count values, for instance, may be used as an indicator of relative distances between or among the wireless communication devices.

Synchronization beacon transmission may be implemented in a neighbor awareness networking (NAN) environment. NAN, as used herein, may refer to exchanging via wireless network communication information about, or actually sharing, services that are provided or directly-accessible by, or otherwise primarily associated with, a given device. By way of example only, NAN may enable a refrigerator to find a device offering internet access to enable the refrigerator to send an updated list of grocery items that need to be purchased by a home owner. As another example, NAN may enable a printer to advertise a capability to provide a hard copy of: (i) a grocery list for a refrigerator, (ii) a guide of available media options during a Friday evening viewing period for a smart television, (iii) a student's project for a school-issued laptop, and so forth. NAN may include, but is not limited to, so-called "Wi-Fi Aware" technology of the Wi-Fi Alliance, a social announcement scheme to enable discovery or advertising of one or more services that may be shared between or among two or more wireless communication devices via at least one announcement operation or message, or combinations thereof.

In one or more example embodiments as described herein, transmission of synchronization beacons with NAN technology may use, or may be implemented in conjunction with or in an environment involving, at least one communication protocol that is compliant with Wi-Fi networking, such as a network implementing or comporting with at least a portion of an IEEE 802.11 standard (e.g., as discussed in the IEEE Std. 802.11-2012, Mar. 29, 2012). Nevertheless, although reference may be made herein to an IEEE 802.11 standard or various aspects thereof (e.g., channels, frequencies, message or frame types, air interface guidelines, or protocol specifications), the techniques and approaches described herein may additionally or alternatively be implemented using one or more other (e.g., wireless) standards or signaling technologies.

For certain example embodiments, wireless communication devices that implement NAN may be organized into clusters. A NAN-implementing device may participate in one or more NAN clusters. A device may leave or move to or join a given cluster depending on preferences or current service desires of the device. NAN may provide a mechanism for devices to synchronize a time or a channel on which they converge to facilitate discovery of services that have been made discoverable by existing devices of a cluster or by new devices that enter a NAN environment. NAN devices may share a common set of NAN parameters, such as: a time duration of a discovery window (DW), a time period between consecutive discovery windows, a beacon interval, NAN Channel(s), combinations thereof, and so forth. Depending on changes to a NAN cluster, including but not limited to changes in which NAN devices are part of a NAN cluster or which NAN devices have what master ranks, different NAN devices may be elected to become a NAN device having a master role at varying times. Examples of roles within NAN environments are described herein below with particular reference to FIG. 2.

Figure 1:
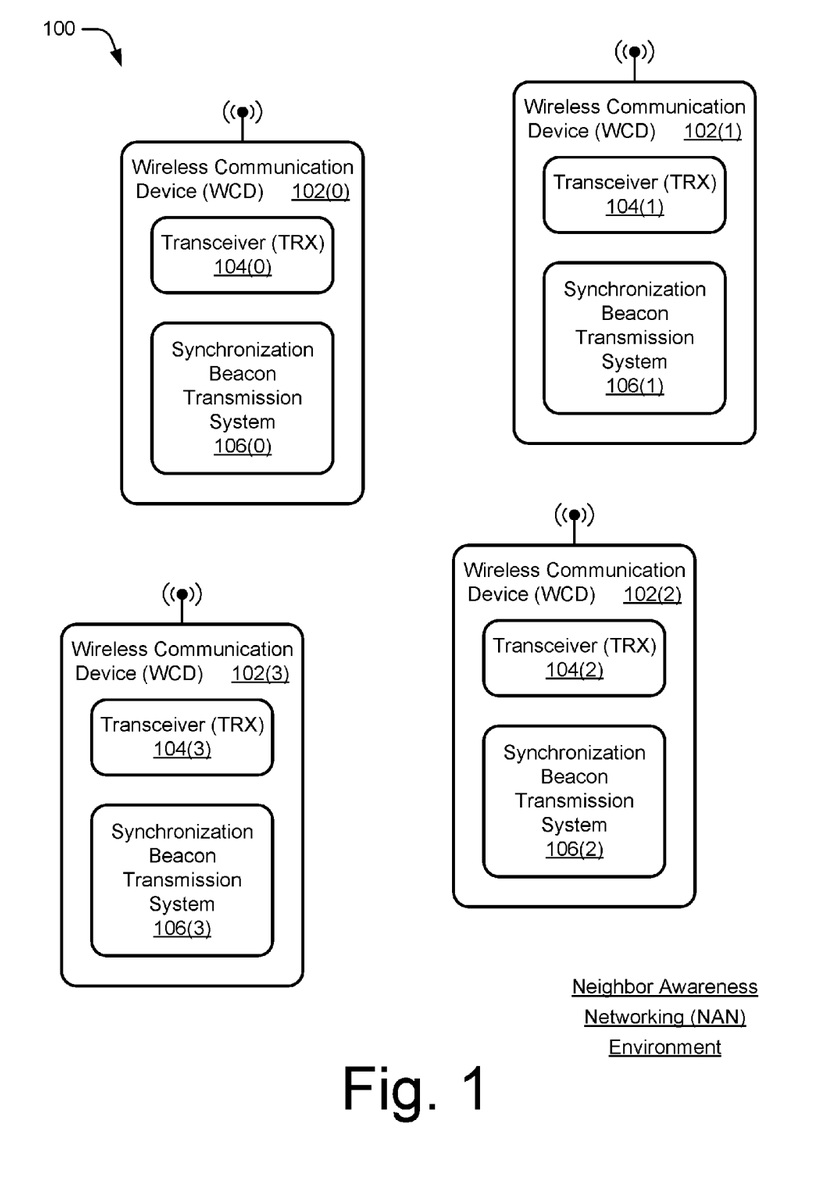
FIG. 1 depicts an example neighbor awareness networking (NAN) environment that includes wireless communication devices for which methods and apparatus for synchronizing beacon transmissions may be implemented in accordance with one or more example embodiments.

FIG. 1 depicts an example neighbor awareness networking (NAN) environment 100 that includes wireless communication devices 102 for which methods and apparatus for synchronizing beacon transmissions may be implemented in accordance with one or more example embodiments. As illustrated, example NAN environment 100 includes multiple wireless communication devices (WCDs) 102, each of which may include at least one transceiver (TRX) 104 and at least one synchronization beacon transmission system 106. A wireless communication device 102 may comprise any object that includes a wireless capability, such as a fixed station, a mobile station, a handset, a system on a chip (SoC), a combination thereof, and so forth. Additional examples of, and description of various components for, a wireless communication device 102 are provided herein below with particular reference to FIG. 9.

As shown, there are four wireless communication devices 102(0), 102(1), 102(2), and 102(3) depicted in a clockwise order starting from the top left corner. A wireless communication device 102(0) may include at least a transceiver 104(0) and a synchronization beacon transmission system 106(0). A wireless communication device 102(1) may include at least a transceiver 104(1) and a synchronization beacon transmission system 106(1). A wireless communication device 102(2) may include at least a transceiver 104(2) and a synchronization beacon transmission system 106(2). And a wireless communication device 102(3) may include at least a transceiver 104(3) and a synchronization beacon transmission system 106(3). Although four wireless communication devices 102 are specifically shown by way of example in FIG. 1, one, two, three or more wireless communication devices 102 may generally operate in a NAN environment 100 to facilitate synchronization beacon transmission.

For certain example embodiments, synchronization beacon transmission functionality may be distributed between or among one or more wireless communication devices 102, such as wireless communication devices 102(0), 102(1), 102(2), or 102(3). Different one(s) of wireless communication devices 102 may perform particular functionality individually or jointly at various times. Descriptions herein generally relate to functionality being distributed among each of wireless communication devices 102(0), 102(1), 102(2), and 102(3). Alternatively, in some situations functionality may be distributed between or among certain wireless communication device(s) 102 but omitted from or latent in other ones (e.g., included in ones with a relatively recent protocol version or with a current synchronization role, but omitted from ones with a relatively older protocol version or latent in ones without a current synchronization role).

For certain example implementations, a transceiver 104 may include a transmitter, a receiver, both a transmitter and a receiver, logic to operate a transmitter or receiver in accordance with (e.g., one or more physical, data link, or network layers of) at least one wireless standard for propagating signals, a receiver chain, a frequency converter, a filter, some combination thereof, and so forth. A wireless communication device 102 may be capable of transmitting a wireless signal, receiving a wireless signal, both transmitting and receiving wireless signals, or some combination thereof using a transceiver 104 via at least one wireless channel. A synchronization beacon transmission system 106 may be configured to process signals that have been received or that are to be transmitted via a transceiver 104, including but not limited to those signals that facilitate or otherwise pertain to a synchronization beacon transmission scheme. Signal processing may include, but is not limited to, interpreting, decoding, formulating, generating, calculating values based on, responding to, or a combination thereof one or more signals. For certain example embodiments, as described further herein, a synchronization beacon transmission system 106 may use one or more indicators of relative distance between or among other wireless communication devices 102 to determine timings for transmitting synchronization beacons.

Figure 2:
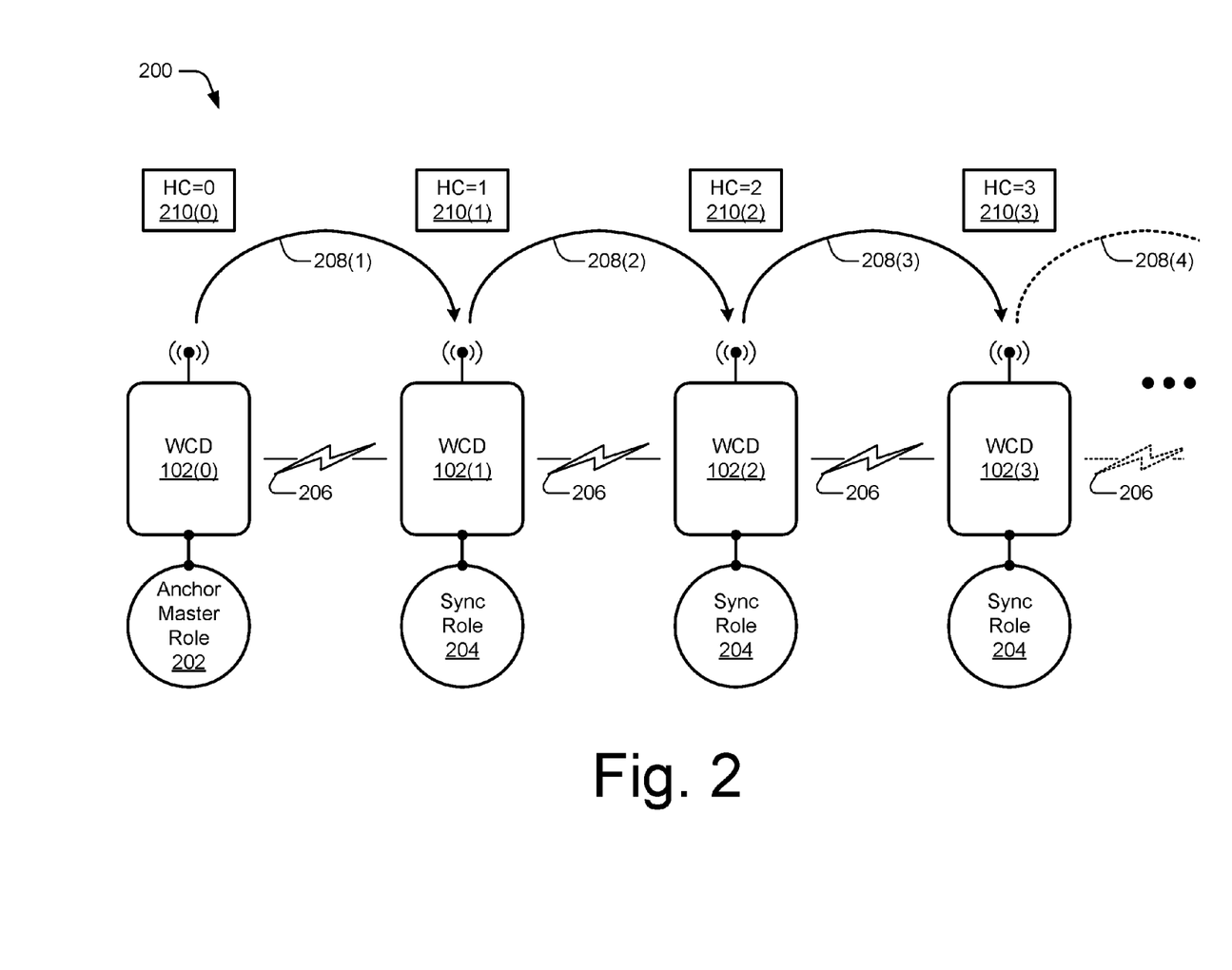
FIG. 2 depicts multiple wireless communication devices that are arranged to illustrate hops and hop counts in accordance with one or more example embodiments.

FIG. 2 depicts at 200 generally multiple wireless communication devices 102 that are arranged to illustrate hops 208 and hop counts 210 in accordance with one or more example embodiments. Depicted generally at 200 are four wireless communication devices 102, multiple roles 202 and 204, four wireless signals 206, four hops 208, and four hop counts 210. More specifically, the following are depicted: wireless communication devices 102(0), 102(1), 102(2), and 102(3); an anchor master role 202 and a synchronization role 204; hops 208(1), 208(2), 208(3), and 208(4); and hop counts 210(0), 210(1), 210(2), and 210(3). Although four wireless communication devices 102, four hops 208, four hop counts 210, etc. are explicitly shown in FIG. 2, fewer or more than four may alternatively be involved in a given implementation. Also, although wireless communication devices 102(0), 102(1), 102(2), and 102(3) and wireless signals 206 are depicted linearly in FIG. 2 for the sake of visual simplicity and to facilitate understanding, wireless communication devices 102 may be located in one or more different geographical arrangements in an actual implementation (e.g., devices 102 may be in a zig-zag pattern, devices 102 may have different elevations, or devices 102 may be scattered randomly).

For certain example embodiments, each wireless communication device 102 is in communication with at least one other wireless communication device 102 via a wireless signal 206. For instance, wireless communication device 102(0) may transmit a wireless signal 206 to be received by wireless communication device 102(1), and wireless communication device 102(3) may receive a wireless signal 206 that was transmitted by wireless communication device 102(2). As shown, wireless communication device 102(0) is associated with an anchor master role 202, and wireless communication devices 102(1), 102(2), and 102(3) are associated with a synchronization role 204. A hop count equal to zero, HC=0 210(0), may be assigned to a wireless communication device 102(0) having a synchronization anchor master role 202.

Role association may be transient or vary over time for any given wireless communication device 102. Generally, roles may be segregated into master roles and non-master roles. A master role may correspond to, by way of example but not limitation, an anchor master role 202 or a standard master role (not explicitly illustrated). A non-master role may correspond to, by way of example but not limitation, a non-master synchronization role or a non-master non-synchronization role. For certain example environments, a role that is associated with a wireless communication device 102 may control (or at least affect) which one or more beacon types, if any, the wireless communication device (i) is permitted to generate or transmit or (ii) is responsible for generating or transmitting. Types of beacons may include, by way of example but without limitation, discovery beacons and synchronization beacons. A discovery beacon may be used to announce (e.g., advertise or discover) services that are made available by or desired by one or more wireless communication devices of a given cluster. A synchronization beacon may be used to distribute a time indicator between or among various wireless communication devices to facilitate temporal synchronization.

For certain example embodiments, a wireless communication device having a master role (e.g., an anchor master role 202 or a standard master role) may have an authority or a responsibility to transmit a discovery beacon or a synchronization beacon for a cluster of wireless communication devices. An anchor master role 202, in particular, may further entail an authority or a responsibility to establish a synchronization time for a cluster. A wireless communication device having a non-master synchronization role may have an authority or a responsibility to transmit a synchronization beacon but not a discovery beacon for a cluster. And a wireless communication device having a non-master non-synchronization role may lack an authority or a responsibility to transmit either a synchronization beacon or a discovery beacon. A synchronization role 204 may refer to an authority or a responsibility to transmit at least a synchronization beacon as either a master or a non-master (e.g., as a standard master role or a non-master synchronization role). Wireless communication device 102(0), which is associated with an anchor master role 202, may transmit a synchronization beacon and establish a timing synchronization for a cluster. Wireless communication devices 102(1), 102(2), and 102(3), which are associated with a synchronization role 204, may transmit synchronization beacons.

Wireless communication device 102(0), which is associated with an anchor master role 202, corresponds to a hop count 210(0) value of zero. There is one hop 208(1) between wireless communication device 102(0) and 102(1). Hence, wireless communication device 102(1) corresponds to an incremented hop count 210(1) value of one. Thus, there is a hop 208(1) between wireless communication device 102(0) and 102(1), a hop 208(2) between wireless communication device 102(1) and 102(2), a hop 208(3) between wireless communication device 102(2) and 102(3), and so forth. Consequently, wireless communication device 102(0) has a hop count 210(0) of zero, wireless communication device 102(1) has a hop count 210(1) of one, wireless communication device 102(2) has a hop count 210(2) of two, wireless communication device 102(3) has a hop count 210(3) of three, and so forth.

For certain example embodiments, hops 208 and hop counts 210 may be at least initially established based on an indicator of distance between two or more wireless communication devices 102. A distance may be determined, by way of example only, by sharing individual physical positioning data (e.g., GPS coordinates), exchanging wireless communications, or a combination thereof. A wireless signal may be propagated between a first and a second wireless communication device (e.g., transmitted by one and received by another). For instance, a wireless signal 206 may be propagated between wireless communication device 102(2) and wireless communication device 102(3). In an IEEE 802.11 environment, for example, a wireless signal 206 may comprise or may carry or may be part of at least one frame (e.g., an action frame, a management frame, a beacon frame, or a combination thereof).

One example technique to determine a distance between two wireless communication devices relies on estimating distance from a received signal strength indication/indicator (RSSI) corresponding to a wireless signal 206. Generally, a stronger RSSI correlates to a shorter distance indicator, depending on initial transmission strength and one or more barriers to signal propagation. Another example technique to determine a distance between two wireless communication devices is Wireless Location Services (WLS), which is a burgeoning 802.11 protocol. With WLS, but by way of example only, two wireless communication devices may send management frames to each other and record a time at which the frames were sent and received. A time of flight (ToF) of at least one frame of one or more exchanged frames may be calculated from recorded timestamp data. A distance indicator between two wireless communication devices may be generated using a time of flight of one or more exchanged frames. A distance indicator with WLS may be accurate, for instance, to within approximately three (3) centimeters (cm).

Figure 3:
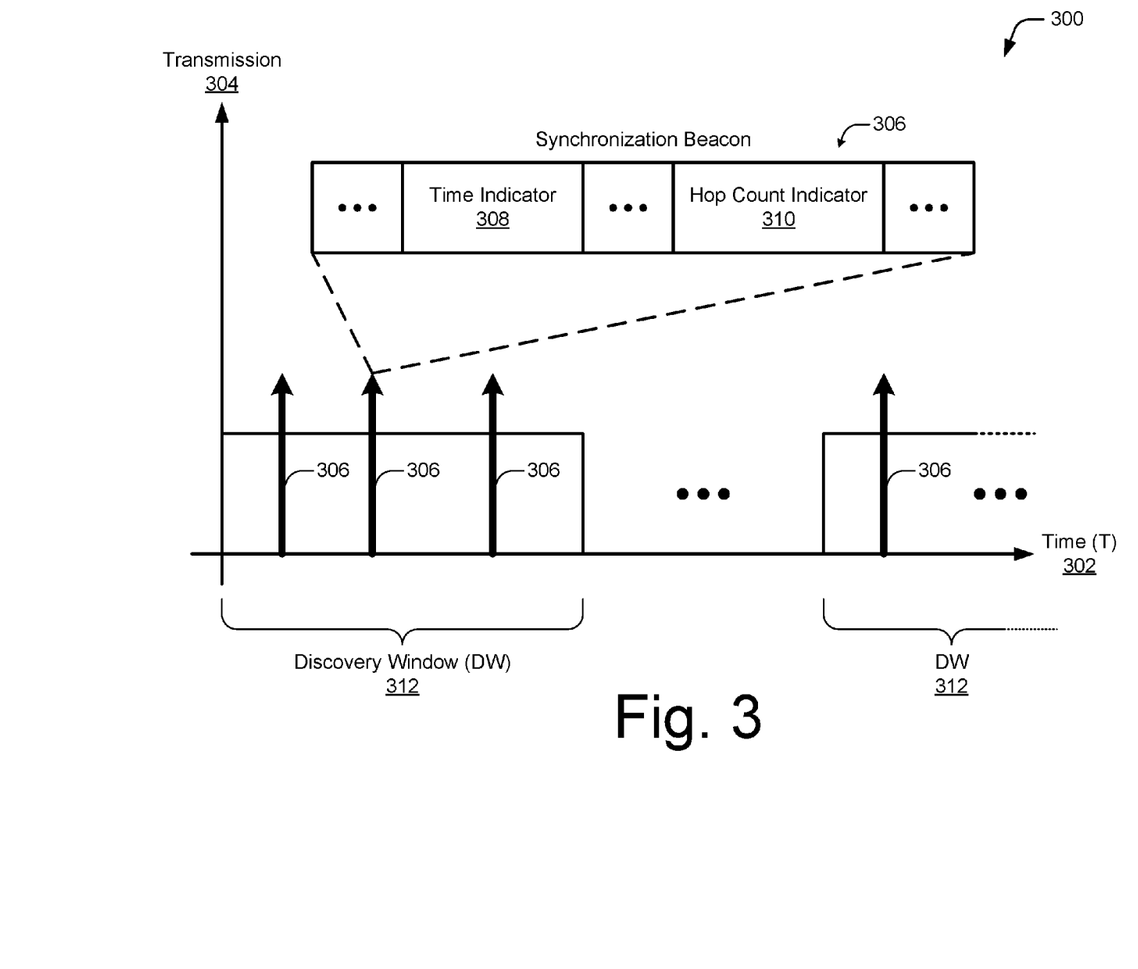
FIG. 3 depicts a graph having multiple transmitted synchronization beacons that may be generated in accordance with one or more example embodiments.

FIG. 3 depicts a graph 300 having multiple transmitted synchronization beacons 306 that may be generated in accordance with one or more example embodiments. For graph 300, time (t) elapses along the abscissa axis 302, and transmission of wireless signals is indicated along the ordinate axis 304. As illustrated, graph 300 includes multiple synchronization beacons 306 and a discovery window (DW) 312. An example synchronization beacon 306 is shown to include a time indicator 308 and a hop count indicator 310.

For certain example embodiments, a discovery window 312 occupies a segment of time 302. A width of a discovery window 312 defines a finite period of time during which beacons, such as synchronization beacons 306, may be transmitted and received by wireless communication devices of a given cluster. Discovery windows 312 may occur at a known or determinable frequency to facilitate the distribution of timing information and therefore the synchronization of wireless communication devices in a given cluster.

A synchronization beacon 306 may include any number of fields in any order. Two example fields are shown in an example order: time indicator 308 and hop count indicator 310. A time indicator 308 may provide a time synchronization value. By way of example only, a time indicator 308 may comprise a timestamp produced in accordance with a timing synchronization function (TSF). A hop count indicator 310 may provide an integer hop count value, such as a hop count 210 (e.g., at least of FIG. 2). By way of example only, a hop count indicator 310 of a received synchronization beacon 306 may reflect a hop count of a wireless communication device that is one-hop closer to an anchor master than a wireless communication device that received the synchronization beacon, and a hop count indicator 310 of a transmitted synchronization beacon 306 may reflect a hop count of the transmitting wireless communication device.

If each synchronization beacon 306 were to be respectively transmitted in an individual, non-overlapping time slot during a discovery window 312 of a finite width, then a number of possible synchronization beacons 306 would likewise be finite. As discussed hereinabove, limiting a number of synchronization beacons 306 also limits a number of hop counts and therefore a potential size of a cluster of wireless communication devices. If synchronization beacons 306 were permitted to be transmitted without any constraint to their timing or location of emanation, then multiple synchronization beacons 306 would likely collide and fail to properly distribute a time indicator 308 for temporal synchronization purposes. If, on the other hand, a technique enabled multiple synchronization beacons 306 to be transmitted substantially simultaneously while reducing a likelihood of collision or mutual interference, then a potential size of a cluster of wireless communication devices may be increased.

Figure 4:
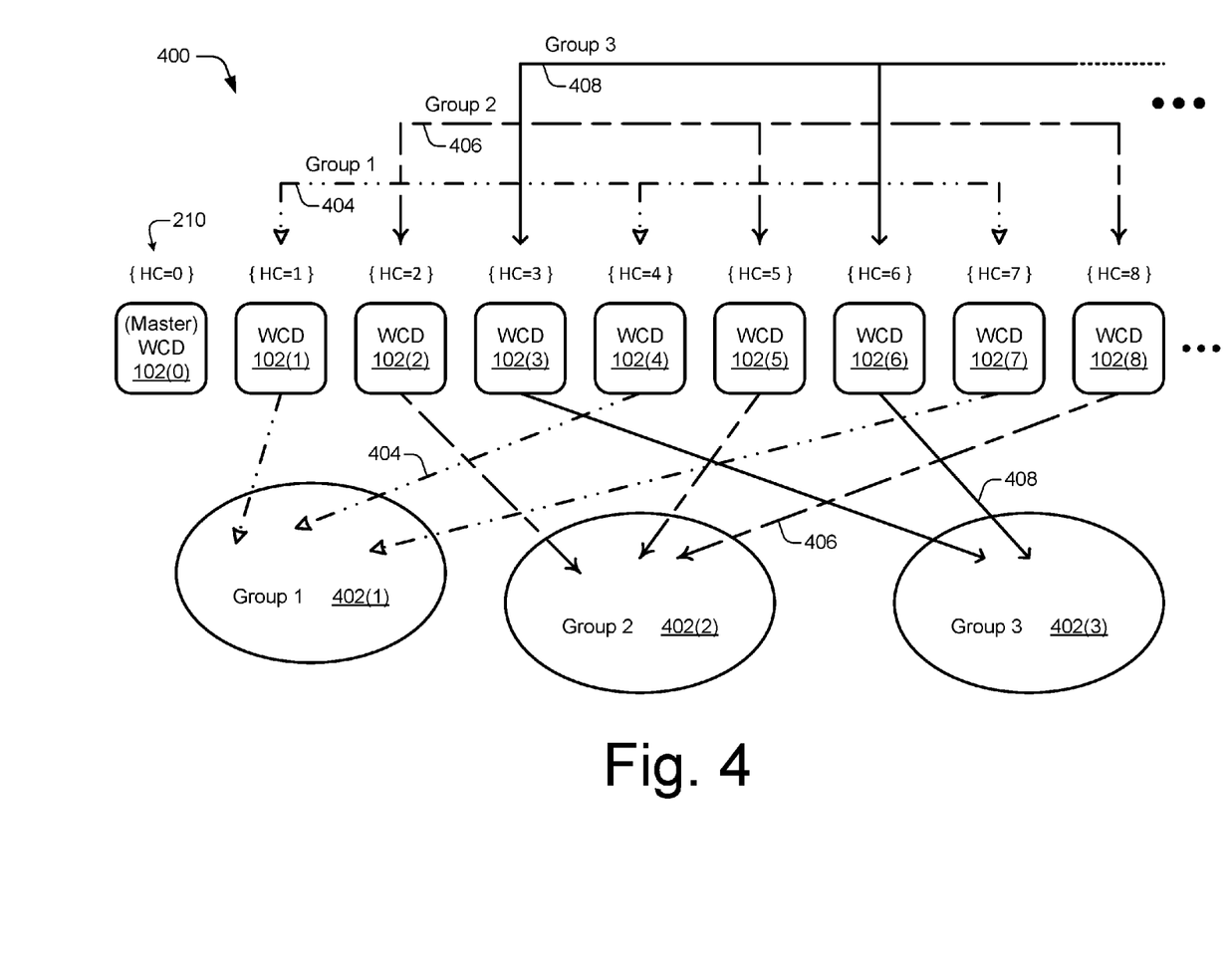
FIG. 4 depicts an example arrangement of wireless communication devices that may be separated into groups in accordance with one or more example embodiments.

FIG. 4 depicts an example arrangement 400 of wireless communication devices 102 that may be separated into groups 402 in accordance with one or more example embodiments. As illustrated, arrangement 400 includes nine wireless communication devices 102, nine hop counts 210 (e.g., "{HC=# }"), and three groups 402, as well as a number of arrows mapping devices to groups. More specifically, nine wireless communication devices 102(0), 102(1), 102 (2), 102(3), 102(4), 102(5), 102(6), 102(7), and 102(8) and three groups 402(1), 402(2), and 402(3) are shown. Although nine wireless communication devices 102 and three groups 402 are explicitly shown in FIG. 4, more or fewer devices or groups may alternatively be involved in a given implementation.

Generally, as a distance between two wireless communication devices 102 increases, a likelihood of one device's transmission interfering with another device's transmission decreases. Consequently, as a distance between two wireless communication devices 102 increases, it becomes relatively safer for both to transmit a synchronization beacon during a same time slot. Wireless communication devices 102 that are geographically separated may be separated into groups 402 that are, for example, permitted to transmit synchronization beacons during a single time slot. As noted above, an indicator of a distance between two wireless communication devices 102 may be determined (i) from absolute positional data (e.g., GPS coordinates) or (ii) relatively using, for instance, RSSI or WLS. As is explained below, another example indicator of distance between two wireless communication devices 102 is hop count values or a differential derived from hop count values.

For certain example embodiments, wireless communication devices 102 may be separated into groups 402 based at least partially on hop count values. For example, a separation operation may include an operation in which every nth wireless communication device 102 may be separated into (e.g., assigned to) a same group 402. Additionally or alternatively, group assignment may be based at least partially on a result of an operation in which a hop count is subject to a modulus operator, in which a hop count is hashed into a group, some combination thereof, and so forth.

As illustrated in the example arrangement 400, every 3rd wireless communication device 102 may be separated into a same group 402 based at least partially on a hop count 210 value that is respectively associated with each wireless communication device 102. More specifically, wireless communication devices 102(1), 102(4), 102(7), etc. are respectively associated with hop counts of one, four, seven, etc. As represented by dotted and dashed arrows 404, wireless communication devices 102(1), 102(4), 102(7), etc. may be separated into a Group 1 402(1). Wireless communication devices 102(2), 102(5), 102(8), etc. are respectively associated with hop counts of two, five, and eight. As represented by dashed arrows 406, wireless communication devices 102(2), 102(5), 102(8), etc. may be separated into a Group 2 402(2). Wireless communication devices 102(3), 102(6), etc. are respectively associated with hop counts of three, six, etc. As represented by solid-lined arrows 408, wireless communication devices 102(3), 102(6), etc. may be separated into a Group 3 402(3). Wireless communication device 102(0), as a master anchor device with an associated hop count of zero, may be independent of other wireless communication devices 102, which independence may be considered a separation into its own group (or no group).

Figure 5:
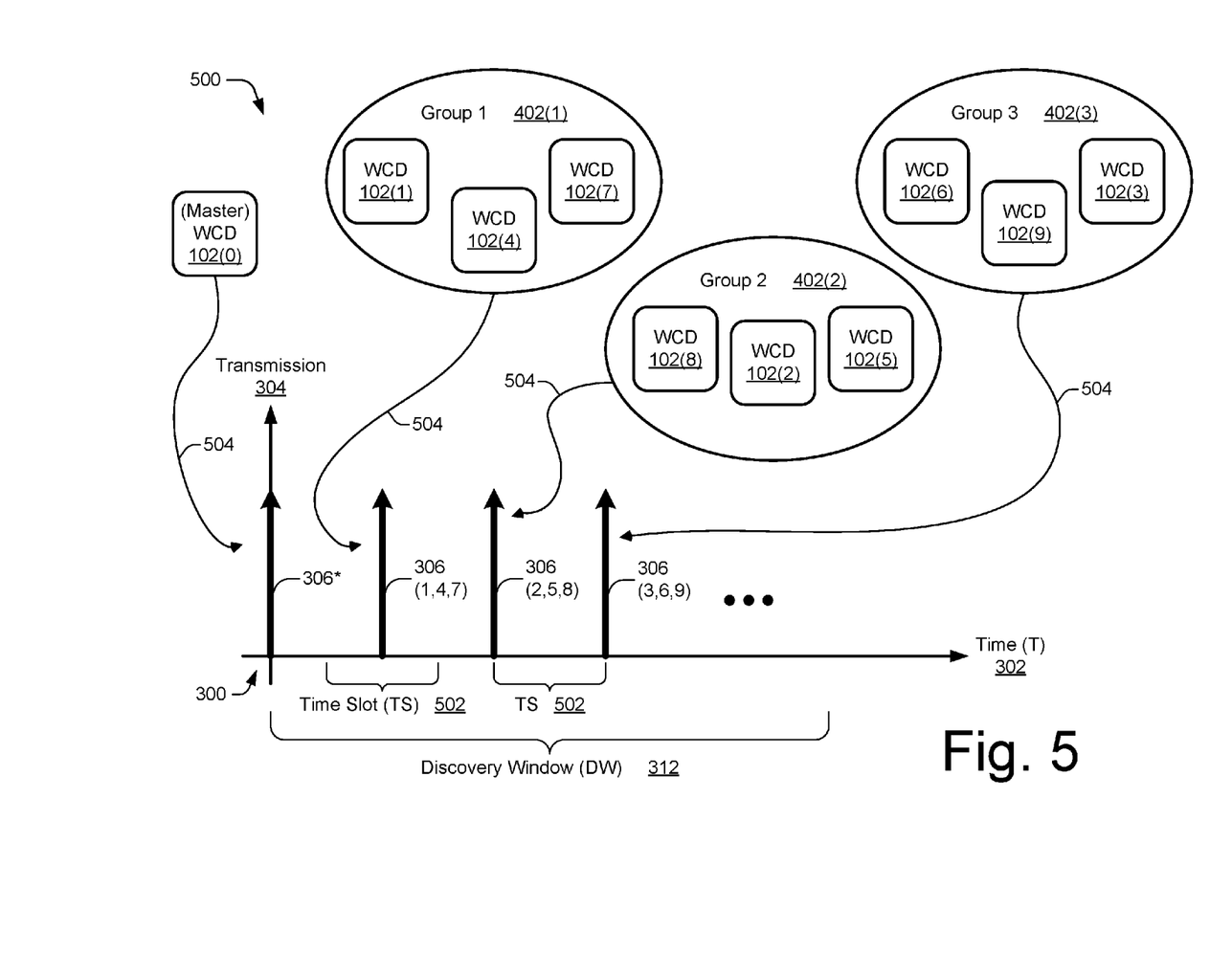
FIG. 5 illustrates multiple groups of wireless communication devices that may be respectively mapped to multiple time slots respectively corresponding to multiple times at which a synchronization beacon may be transmitted in accordance with one or more example embodiments.

FIG. 5 illustrates at 500 generally multiple groups 402 of wireless communication devices 102 that may be respectively mapped 504 to multiple time slots 502 respectively corresponding to multiple times at which a synchronization beacon 306 may be transmitted in accordance with one or more example embodiments. As illustrated, FIG. 5 includes a synchronization master wireless communication device 102(0), three groups 402 having multiple wireless communication devices 102, a graph 300 having multiple synchronization beacons 306, and multiple mappings 504 between (i) groups 402 and (ii) time slots 502 or corresponding synchronization beacons 306. Graph 300 includes a time axis 302 versus a transmission axis 304. Along time axis 302, a discovery window 312 is indicated. Within discovery window 312, multiple time slots 502 are indicated. Although ten wireless communication devices 102, ten synchronization beacons 306, and three groups 402 are explicitly shown in FIG. 5, more or fewer devices, beacons, or groups may alternatively be involved in a given implementation.

Multiple synchronization beacons 306 are graphed along time axis 302. More specifically, synchronization beacon 306*; synchronization beacons 306(1), 306(4), and 306(7); synchronization beacons 306(2), 306(5), and 306(8); synchronization beacons 306(3), 306(6), 306(9); and so forth are shown. Multiple groups 402 are associated with multiple wireless communication devices 102 that have been assigned thereto. More specifically, Group 1 402(1) is associated with wireless communication devices 102(1), 102(4), 102(7), etc.; Group 2 402(2) is associated with wireless communication devices 102(2), 102(5), 102(8), etc.; Group 3 402(3) is associated with wireless communication devices 102(3), 102(6), 102(9), etc.; and so forth.

For certain example embodiments, a synchronization beacon 306* that corresponds to a synchronization anchor master wireless communication device 102(0) may be transmitted at a start time of a discovery window 312 or at a time that is distinct from other synchronization beacons 306. In contrast, multiple synchronization beacons 306 may be transmitted during other time slots 502. By way of example only, two embodiments for a time slot (TS) 502 are shown. For the time slot 502 that is pictured on the left, one or more synchronization beacons 306 may be transmitted during an internal portion of time slot 502 (e.g., approximately in the middle of time slot 502). For the time slot 502 that is pictured on the right, one or more synchronization beacons 306 may be transmitted at an edge portion of time slot 502 (e.g., approximately at the end of time slot 502). A time slot 502 may correspond to a (e.g., instantaneous) time or a time range. Moreover, time slots 502 may be defined with alternative widths, with different guard or buffer periods between consecutive time slots 502, with respect to other placements of synchronization beacons 306, some combination thereof, etc. in other embodiments.

In an example operation for one or more embodiments, a synchronization anchor master wireless communication device 102(0) may be mapped 504 to a synchronization beacon 306* or a time corresponding thereto, such as to an initial time slot 502 (not explicitly shown) or a start time of a discovery window 312. For other wireless communication devices 102, groups 402, which are associated with multiple wireless communication devices 102, may be respectively mapped 504 to synchronization beacons 306 or times corresponding thereto, such as to time slots 502 as shown. For instance, for Group 1 402(1): wireless communication device 102(1) may be mapped 504 to a transmission time for synchronization beacon 306(1), wireless communication device 102(4) may be mapped 504 to a transmission time for synchronization beacon 306(4), wireless communication device 102(7) may be mapped 504 to a transmission time for synchronization beacon 306(7), and so forth. In other words, wireless communication devices 102 that are separated into Group 1 402(1) (e.g., wireless communication devices 102 (1), 102(4), 102(7), etc.), may be mapped to a same transmission time, such as a same time slot 502. Although each of wireless communication devices 102(1), 102(4), 102(7), etc. may transmit a respective synchronization beacon 306 at substantially a same time, a likelihood of interference is reduced inasmuch as some distance physically separates the devices. By way of example only, a physical distance of separation may be related to a hop count differential between wireless communication devices 102 (e.g., three hops in the examples of FIGS. 4 and 5).

As discussed above, a hop count may be correlated to how far away a node is to an anchor master node, as well as how far apart a given node is to one or more other nodes along a hop count chain. For example, a node associated with a hop count of one may be sufficiently distant from a node having a hop count of six that temporally-overlapping transmissions are unlikely to mutually interfere with one another. These two nodes, with example hop counts of one and six, may therefore be able to transmit their respective synchronization beacons substantially simultaneously without adversely impacting distribution of temporal synchronization data for a cluster of nodes.

For certain example embodiments, a hop count of a wireless communication device (e.g., for hop counts greater than zero) may be modded (e.g., subjected to a modulus/modulo mathematical or logical operation) into a grouping characteristic or distance separation factor, which grouping characteristic/distance separation factor is represented by a variable "Z" herein. A hop count of zero (i.e., HC=0) may be reserved for an anchor master wireless communication device. Transmission times for synchronization beacons may be determined in accordance with the following Equation (1), which has two portions—Equation (1a) and Equation (1b):

For a hop count of zero (HC=0), a transmission time may be determined from:

$$T_{pkt}(p) = T\text{StartDW; and} \quad (1a)$$

for a hop count greater than zero (HC>0), a transmission time may be determined from:

$$T_{pkt}(p) = T\text{StartDW} + [((HC-1)\% Z) + 1] * 40 * a\text{SlotTime}T(pk), \quad (1b)$$

wherein "$T_{pkt}(p)$" represents a transmission time for a synchronization beacon—which may have a value that comprises a relative offset time and be offset from a start time of a discovery window, "TStartDW" represents a start time of a discovery window—which may have a value that is relative to a cluster synchronized time, "HC" represents a hop count value (e.g., for a wireless communication device that is calculating a transmission time), "Z" represents a distance separation factor or grouping characteristic, "aSlotTimeT(pk)" represents a length of time to at least partially buffer or guard consecutive synchronization beacons. The operator "%" represents a modulus or modulo operation. By way of example only, a value for "aSlotTimeT(pk)" may be nine micro-seconds (9 μs).

Figure 6:
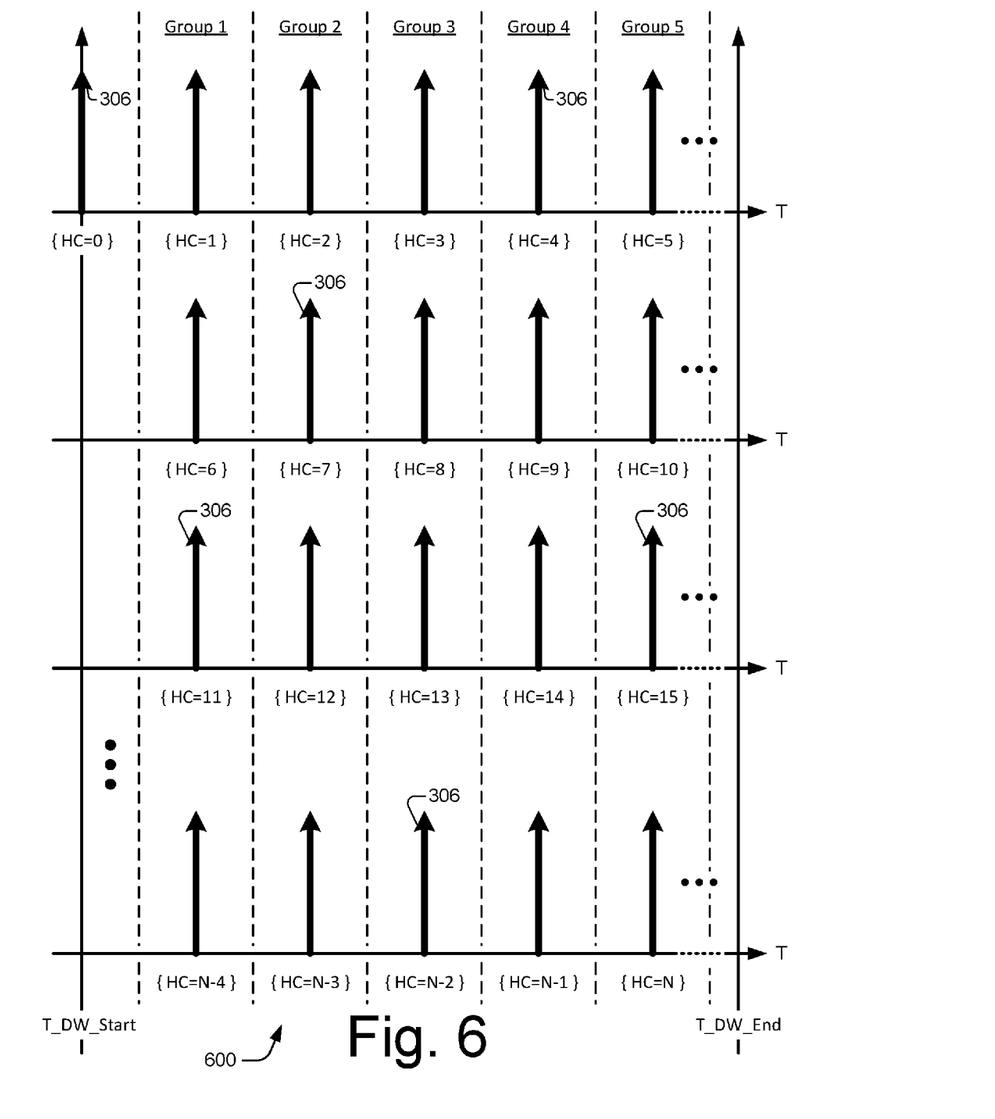
FIG. 6 depicts a graph of multiple synchronization beacons that illustrate a relationship between groups of wireless communication devices and transmission times over a discovery window in accordance with one or more example embodiments.

FIG. 6 depicts a graph 600 of multiple synchronization beacons 306 that illustrate a relationship between groups of wireless communication devices and transmission times over a discovery window in accordance with one or more example embodiments. As illustrated, graph 600 includes four abscissa axes representing elapsed time (T), two ordinate axes representing transmissions, multiple synchronization beacons 306, five groups 1-5 of synchronization beacons that are spread at least partially across a discovery window, and multiple hop count indications (e.g., "{HC=#}"). As shown, a discovery window has edges marked by "T_DW_Start" and "T_DW_End." Although five groups are shown in FIG. 6 and discussed below, more or fewer groups may be created or present in actual implementations.

By way of example only, a distance separation factor or grouping characteristic (e.g., the variable "Z" in Equation (1b) above) is set to five (5) in this example. Consequently, five groups are shown. In addition to a synchronization anchor master wireless communication device having a hop count of zero in the top left of graph 600, there are "N" wireless communication devices 1, 2, 3 . . . N−1, N that are associated with a synchronization role (e.g., synchronization role 204 of FIG. 2), with "N" representing a positive integer. "N" wireless communication devices 1, 2, 3 . . . N−1, N respectively correspond to "N" hop counts 1, 2, 3 . . . N−1, N. After at least application of the example transmission time Equation (1b), wireless communication devices 102 may be separated into groups with corresponding transmission times according to their associated hop counts as follows: Group 1 is associated with hop counts of 1, 6, 11 . . . N−4; Group 2 is associated with hop counts of 2, 7, 12 . . . N−3; Group 3 is associated with hop counts of 3, 8, 13 . . . N−2; Group 4 is associated with hop counts of 4, 9, 14 . . . N−1; and Group 5 is associated with hop counts of 5, 10, 15 . . . N. Thus, a number of hop counts and corresponding synchronization beacons need not be limited solely by a finite width of a discovery window.

Figure 7:
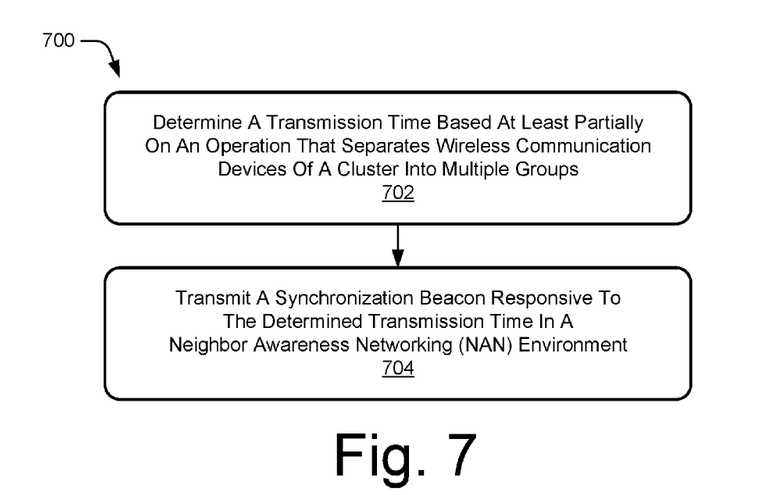
FIG. 7 is a flowchart illustrating an example process for synchronizing beacon transmissions in a NAN environment in accordance with one or more example embodiments.

FIG. 7 is a flowchart illustrating an example process 700 for synchronizing beacon transmissions in a NAN environment in accordance with one or more example embodiments. Process 700 is described in the form of a set of blocks 702-704 that specify operations that may be performed; however, operations are not necessarily limited to the order shown in FIG. 7 or described herein, for the operations may be implemented in alternative orders or in fully or partially overlapping manners. Operations represented by the set of blocks in process 700 may be performed by a wireless communication device 102, such as a wireless communication device 102(0), 102(1) . . . 102(9) (e.g., of at least FIG. 1, 2, 4, or 5).

Figure 9:
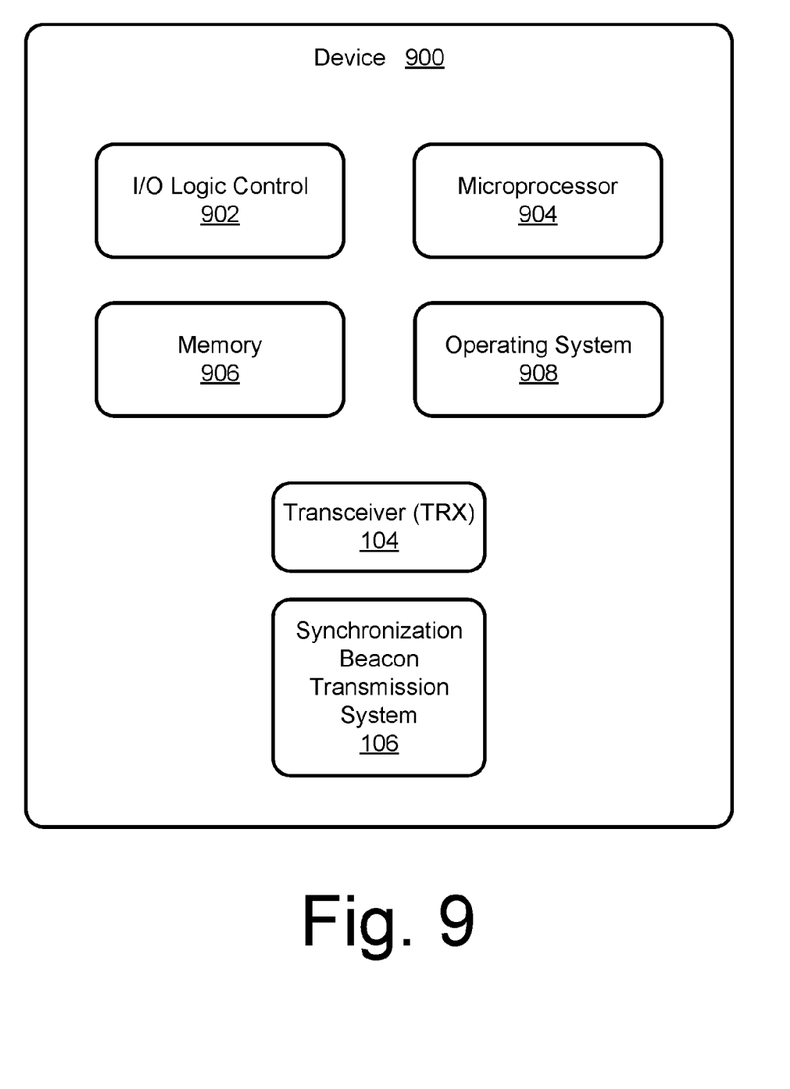
FIG. 9 depicts an example device that can implement various aspects of the mechanisms and processes described herein.

For certain example embodiments, a transceiver (e.g., a transceiver 104 of at least FIG. 1 or 9) may at least partially perform operation(s) of block 704, and a synchronization beacon transmission system (e.g., a synchronization beacon transmission system 106 of at least FIG. 1 or 9) may at least partially perform operation(s) of block 702 or 704.

At block 702, a transmission time may be determined based at least partially on an operation that separates wireless communication devices of a cluster into multiple groups. For example, a synchronization beacon transmission system 106 may determine (e.g., compute, calculate, consult a look-up table, a combination thereof) a transmission time (e.g., a time slot 502, a portion of a discovery window 312, a time relative to a cluster synchronization time, a time that is offset from a start time of a discovery window 312, a combination thereof) based at least partially on (e.g., using, responsive to, generated from a result of, derived from data associated with, or combination thereof) an operation (e.g., a formulaic action, a calculation, an algorithm, a comparison, an assignment, or a combination thereof) that separates (e.g., segregates, assigns, apportions, allocates, organizes, or a combination thereof) wireless communication devices (e.g., wireless communication devices 102) of a cluster (e.g., a collection of devices in a NAN environment, a number of devices having a same anchor master to establish a temporal synchronization, a self-organized set of devices, or a combination thereof) into multiple groups (e.g., groups 402).

At block 704, a synchronization beacon may be transmitted responsive to a determined transmission time in a neighbor awareness networking (NAN) environment. For example, a synchronization beacon (e.g., a synchronization beacon 306, one or more frames facilitating temporal synchronization for a cluster, a wireless signal 206 having a time indicator 308 for a NAN environment, or a combination thereof) may be transmitted (e.g., sent over a wireless interface, emanated from an antenna, coupled to a radio or antenna, or a combination thereof) by a transceiver 104 in conjunction with synchronization beacon transmission system 106 responsive to (e.g., as a result of, in accordance with, substantially matching, using a value associated with, or a combination thereof) a transmission time (e.g., a time slot 502, a portion of a discovery window 312, a time relative to a cluster synchronization time, a time that is offset from a start time of a discovery window 312, a combination thereof) in a NAN environment (e.g., a communication environment in which two or more wireless communication devices exchange information about, or actually share, services that are provided or directly-accessible by, or otherwise primarily associated with, a given device).

Figure 8:
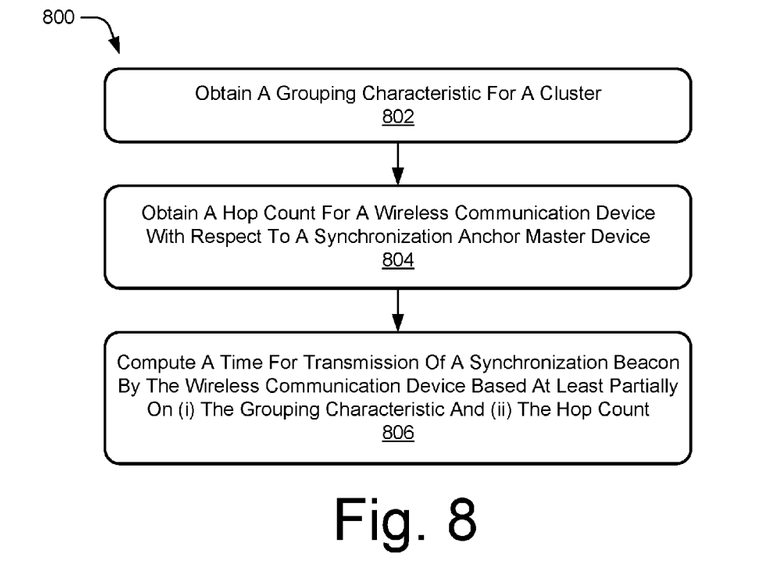
FIG. 8 is a flowchart illustrating another example process for synchronizing beacon transmissions in a NAN environment in accordance with one or more example embodiments.

FIG. 8 is a flowchart illustrating another example process 800 for synchronizing beacon transmissions in a NAN environment in accordance with one or more example embodiments. Process 800 is described in the form of a set of blocks 802-806 that specify operations that may be performed; however, operations are not necessarily limited to the order shown in FIG. 8 or described herein, for the operations may be implemented in alternative orders or in fully or partially overlapping manners. Operations represented by the set of blocks in process 800 may be performed by a wireless communication device 102, such as a wireless communication device 102(0), 102(1) . . . 102(9) (e.g., of at least FIG. 1, 2, 4, or 5).

For certain example embodiments, a synchronization beacon transmission system (e.g., a synchronization beacon transmission system 106 of at least FIG. 1 or 9) may at least partially perform operation(s) of block 802, 804, or 806. Process 800 may serve as an example embodiment for block 702 of process 700 (e.g., of FIG. 7). At block 802, a grouping characteristic/distance separation factor may be obtained for a cluster. For example, a value that indicates (i) a number of groups for a cluster or (ii) a (e.g., minimum) number of hops between two wireless communication devices that are to substantially simultaneously transmit synchronization beacons may be received via a wireless signal (e.g., if the value varies by cluster) or retrieved from memory (e.g., if there is at least a specified default value stored for a standard).

At block 804, a hop count may be obtained for a wireless communication device with respect to a synchronization anchor master wireless communication device for a cluster. For example, a number of hops that separates a given wireless communication device and an anchor master wireless communication device for a cluster may be received via a wireless signal (e.g., from a device that is one hop closer) or calculated (e.g., by incrementing a received hop count value) or retrieved from memory (e.g., if previously determined). At block 806, a time for transmission of a synchronization beacon by a wireless communication device may be computed based at least partially on (i) a grouping characteristic and (ii) a hop count. For example, a time, such as a time slot or a time calculated relative to a discovery window start time, at which a wireless communication device is to transmit a synchronization beacon may be computed using a grouping characteristic, such as is represented by the variable "Z" in Equation (1b) above, and using a hop count, such as is represented by the variable "HC" in Equation (1b) above.

The example techniques and approaches described herein support various different usage scenarios. For example, as noted herein above, example techniques and approaches may be implemented in a Wi-Fi scenario. More specifically, but by way of example only, they may be implemented in Wi-Fi networks in which neighbor awareness networking (NAN) is being utilized in accordance with so called "Wi-Fi Aware" technology. With NAN generally, and "Wi-Fi Aware" technology specifically, social networking may be at least partially standardized or synchronized so as to facilitate relatively faster, more power efficient, or more certain discovery or advertising of services within direct or indirect radio range of a given wireless node.

In one or more example usage scenarios, certain example embodiments for synchronization beacon transmission may enable a more efficient usage of a wireless medium inasmuch as distance-based grouping of wireless communication devices facilitates simultaneous transmissions of synchronization beacons while managing signal contention. Moreover, a number of hop counts that may be included within a discovery window is not limited by a width of the discovery window. In other words, a temporal length of a discovery window does not institute a hard cap on a number of synchronization beacons that may be transmitted during the discovery window. Consequently, more wireless communication devices may serve as beacon-transmitting synchronization devices within a given cluster, and the given cluster is therefore enabled to grow larger and thus share services over a greater distance or a greater number of devices.

Grouping wireless communication devices based on a distance indicator for purposes of transmitting synchronization beacons is described herein above for certain example embodiments as being applicable in a NAN context. However, wireless communication device grouping is not so limited. For example, in addition to also being applicable outside of NAN environments, grouping of wireless communication devices based on a distance indicator may also or instead be applied to transmission of other signals.

FIG. 9 depicts an example device 900 that can implement various aspects of the mechanisms and processes described herein. For certain example embodiments, device 900 may be realized as any one or more of a variety of different devices, including but not limited to, a media device, a computer device, a television set-top box, a video processing and/or rendering device, an Ethernet interface, a switch, an access point (AP), a home appliance device, a gaming device, an electronic device, a vehicle, a workstation, a smart phone, a tablet, a printer, a home automation device, a security or safety device such as a camera or a fire detector or a door lock, a wearable such as a smart watch or intelligent glasses or a jacket or bag, a Wi-Fi chip, another type of computing device, or some combination thereof. Device 900 may be implemented as a System-on-Chip (SoC).

For certain example implementations, device 900 may include electronic circuitry, which has at least one hardware component or tangible aspect; at least one microprocessor; at least one memory; input-output (I/O) logic control; one or more modules; one or more communication interfaces or components; other hardware, firmware, or software applicable to enabling a device to function; some combination thereof; and so forth. Device 900 may also include at least one internal (e.g., integrated) data bus (not explicitly shown in FIG. 9) that couples various components of the device for data communication between or among the various components. A wireless communication device that comprises device 900 or includes device 900 as a sub-part thereof may be implemented with many combinations of differing components.

Continuing with FIG. 9, example device 900 as illustrated may include various components such as an input-output (I/O) logic control 902 (e.g., which may include electronic circuitry) or a microprocessor 904 (e.g., at least one of a microcontroller, a digital signal processor (DSP), a power-efficient mobile-oriented processing unit, or a combination thereof). Device 900 may also include at least one memory 906, which may include any one or more types of memory, such as random access memory (RAM), low-latency non-volatile memory (e.g., Flash memory), read only memory (ROM), one-time programmable memory, other suitable electronic or solid state data storage, some combination thereof, and so forth. By way of example only, memory 906 may include one or more tangible or non-transitory storage media. Additionally or alternatively, device 900 may include a memory interface for accessing supplementary or removable or expandable off-chip memory, such as an external Flash memory module.

Device 900 may also include various stored, executable, or executing firmware or software, such as an operating system 908, which may include computer-executable instructions maintained by memory 906 and executed by microprocessor 904. Device 900 may also include other various communication interfaces; communication components; other hardware, firmware, or software; some combination thereof; and so forth. An example of one or more communication components may include, but is not limited to, at least one transceiver (TRX) 104 (e.g., which is described herein above with particular reference to at least FIG. 1).

Example device 900 may also include a synchronization beacon transmission system 106 that enables at least some synchronization beacon transmission techniques to be implemented as described herein. A synchronization beacon transmission system 106 is explicitly illustrated in FIG. 1. However, various example embodiments or implementation aspects of a synchronization beacon transmission system 106 are described hereinabove with reference to any one or more of FIGS. 1-8. A synchronization beacon transmission system 106 may be implemented in hardware, firmware, software, combinations thereof, and so forth.

One or more of the example methods or techniques or processes that are described hereinabove may take the form of at least one computer program product that is accessible from a computer-usable or computer-readable medium providing program code for use by or in connection with a computer or another processing device or any instruction execution system. For purposes of this description, a computer-usable or computer-readable medium may be any apparatus that can tangibly store a program for use by or in connection with an instruction execution system, apparatus, or device. A medium may be an electronic, magnetic, optical, electromagnetic, infrared, semiconductor, or a combination thereof, etc. system (or apparatus or device or article of manufacture). Examples of a computer-readable medium may include, but are not limited to, a semiconductor or solid state memory, magnetic tape, a removable computer diskette, a random access memory (RAM), a read-only memory (ROM), a rigid magnetic disk, an optical disc, or a combination thereof. Examples of optical discs may include, but are not limited to, a compact disc-read only memory (CD-ROM), a compact disc-read/write (CD-R/W), digital versatile disc (DVD), or a combination thereof. A computer-usable or computer-readable medium may include computer-readable memory devices, which may include any of the devices or mediums discussed above, although it excludes signals, signal transmission, and carrier waves. With regard to terminology, unless context dictates otherwise, use herein of the word "or" may be considered use of an "inclusive or," or a term that permits inclusion or application of one or more items that are linked by the word "or" (e.g., a phrase "A or B" may be interpreted as permitting just "A," permitting just "B," or permitting both "A" and "B").

Although subject matter has been described in language specific to structural features and/or methodological operations, it is to be understood that the subject matter defined in the appended claims is not necessarily limited to the specific features or operations described above, including orders in which they are performed.

The invention claimed is:

1. A first wireless communication device comprising:
   a transceiver configured to transmit a synchronization beacon in a neighbor awareness networking (NAN) environment, wherein the NAN environment includes a plurality of wireless communication devices arranged in a cluster; and
   a synchronization beacon transmission system configured to
      determine if the first wireless communication device is associated with a synchronization role, and if the first wireless communication device is determined to be associated with the synchronization role,
         determine a transmission time based at least partially on an operation that separates the wireless communication devices of the cluster into multiple groups, and
         cause the transceiver to transmit the synchronization beacon responsive to the determined transmission time, and
      determine if the first wireless communication device is associated with an anchor master role, and if the first wireless communication device is determined to be associated with the anchor master role,
         cause the transceiver to transmit the synchronization beacon substantially at a start time of a discovery window.

2. The first wireless communication device of claim 1, wherein:
   the transceiver is further configured to transmit the synchronization beacon during the discovery window but after the start time if the first wireless communication device is determined to be associated with the synchronization role.

3. The first wireless communication device of claim 1, wherein the wireless communication devices of the cluster include the first wireless communication device; and wherein:
   the transceiver is further configured to transmit the synchronization beacon to facilitate temporal synchronization between or among the wireless communication devices at least within the cluster of the NAN environment.

4. The first wireless communication device of claim 1, wherein the operation includes use of a hop count; and wherein:

the synchronization beacon transmission system is further configured to determine the transmission time based at least partially on the operation that uses the hop count.

5. The first wireless communication device of claim 1, wherein the operation includes use of a modulus operator; and wherein:
the synchronization beacon transmission system is further configured to determine the transmission time based at least partially on the operation that uses the modulus operator.

6. The first wireless communication device of claim 1, wherein the operation comprises a hop count, corresponding to the first wireless communication device, being subjected to a modulo operation with respect to a value that at least partially establishes a total number of groups for the multiple groups; and wherein:
the synchronization beacon transmission system is further configured to determine the transmission time based at least partially on the operation that is at least partly dependent on (i) the hop count and (ii) the value.

7. The first wireless communication device of claim 1, wherein:
the transceiver is further configured to receive a hop count value that is indicative of a hop count of a second wireless communication device that is one hop closer to an anchor master device than the first wireless communication device, if the first wireless communication device is determined to be associated with the synchronization role.

8. The first wireless communication device of claim 1, wherein the synchronization beacon comprises a time indicator and a hop count indicator.

9. The first wireless communication device of claim 8, wherein the time indicator comprises a time stamp to facilitate a temporal synchronization of the cluster of the NAN environment.

10. A method configured to be implemented with a first wireless communication device, the method comprising:
determining, in a neighbor awareness networking (NAN) environment that includes a plurality of wireless communication devices arranged in a cluster, a transmission time based at least partially on an operation that separates the wireless communication devices of the cluster into multiple groups, the operation including
assigning the first wireless communication device into a group of the multiple groups based at least partially on a received indicator of relative distance with respect to at least a second wireless communication device of the wireless communication devices of the cluster; and
transmitting a synchronization beacon in the NAN environment responsive to the determined transmission time.

11. The method of claim 10, wherein the transmission time comprises a time slot having a time range; and wherein the determining comprises determining the time slot with the time slot to be shared by at least a third wireless communication device that is separated into the group of the multiple groups.

12. The method of claim 10, wherein the transmission time comprises a relative offset time that is at least partially dependent on a start time of a discovery window; and wherein the determining comprises determining the relative offset time using the start time of the discovery window.

13. The method of claim 10, wherein the received indicator of relative distance comprises a hop count indicator.

14. The method of claim 13, wherein the determining comprises determining the group of the multiple groups by mapping a hop count value of the hop count indicator to the group of the multiple groups.

15. The method of claim 14, wherein the mapping comprises modding the hop count value using a grouping characteristic indicative of a total number of groups for the multiple groups of the cluster.

16. A computer-readable memory device comprising computer-executable instructions that, when executed, implement a system in a first wireless communication device to:
determine, in a neighbor awareness networking (NAN) environment that includes a plurality of wireless communication devices arranged in a cluster, a transmission time based at least partially on an operation that separates the wireless communication devices of the cluster into multiple groups, including to
obtain a grouping characteristic of the cluster,
obtain a hop count for the first wireless communication device with respect to an anchor master for the cluster, and
compute the transmission time for a synchronization beacon based at least partially on (i) the obtained grouping characteristic and (ii) the obtained hop count; and
transmit the synchronization beacon in the NAN environment responsive to the determined transmission time.

17. The computer-readable memory device of claim 16, wherein to determine comprises to determine the transmission time so as to enable respective ones of the wireless communication devices that are separated into a same group of the multiple groups to transmit respective synchronization beacons at a same time.

18. The computer-readable memory device of claim 16, wherein to compute comprises to compute the transmission time at least partially in accordance with Transmission Time=TStartDW+[((HC−1) % Z)+1]*40*aSlotTimeT, wherein "TStartDW" represents a start time of a discovery window, "HC" represents the obtained hop count, "Z" represents the obtained grouping characteristic, and "aSlotTimeT" represents a length of time to at least partially buffer consecutive synchronization beacons.

19. The computer-readable memory device of claim 16, wherein the synchronization beacon includes a time indicator that facilitates temporal synchronization for at least some of the wireless communication devices of the cluster; and wherein to transmit comprises to transmit the synchronization beacon that includes the time indicator.

20. The computer-readable memory device of claim 16, wherein the system in the first wireless communication device is further to:
determine if the first wireless communication device is associated with a synchronization role; and
transmit the synchronization beacon in the NAN environment based on a determination that the first wireless communication device is associated with the synchronization role.

* * * * *